United States Patent [19]
Ozarowski et al.

[11] Patent Number: 5,349,983
[45] Date of Patent: Sep. 27, 1994

[54] PROPORTIONAL CONTROL VALVE FOR PATIENT SUPPORT SYSTEM

[75] Inventors: Ryszard S. Ozarowski, Marietta, Ga.; Barry D. Hand, Mt. Pleasant; Robert C. Novack, Charleston, both of S.C.; Vernon D. Beard, Pompano Beach, Fla.; James O. Threlkeld, Denver, N.C.; William T. Sutton, Charleston, S.C.

[73] Assignee: SSI Medical Services, Inc., Charleston, S.C.

[21] Appl. No.: 88,541

[22] Filed: Jul. 7, 1993

[51] Int. Cl.⁵ .............................................. F16K 31/04
[52] U.S. Cl. .................................... 137/487.5; 5/453; 137/625.22; 251/129.11; 251/312
[58] Field of Search ............ 5/453; 137/487.5, 625.22; 251/81, 129.11, 312

[56] References Cited

U.S. PATENT DOCUMENTS

| | | |
|---|---|---|
| 1,805,106 | 5/1931 | Robinson . |
| 1,850,850 | 3/1932 | Peterson . |
| 1,898,147 | 2/1933 | Smith . |
| 2,201,363 | 5/1940 | Campbell . |
| 2,554,040 | 5/1951 | Long . |
| 2,872,154 | 2/1959 | Jones ........................ 251/129.11 |
| 2,914,088 | 11/1959 | Beaman et al. . |
| 3,068,902 | 12/1962 | Brumbaugh . |
| 3,092,141 | 6/1963 | Stark . |
| 3,347,235 | 10/1967 | Hunnicutt .................. 251/129.11 X |
| 3,429,232 | 2/1969 | Weiss ......................... 251/129.11 X |
| 3,433,261 | 3/1969 | Fox . |
| 3,459,221 | 8/1969 | Axelrod . |
| 3,505,888 | 4/1970 | Denkowski . |
| 3,563,268 | 2/1971 | Williams . |
| 3,587,568 | 6/1971 | Thomas . |
| 3,810,136 | 5/1974 | Lang et al. . |
| 3,820,094 | 6/1974 | Mouri et al. . |
| 4,000,878 | 1/1977 | Vick . |
| 4,036,249 | 7/1977 | Perry et al. ................. 251/287 X |
| 4,114,465 | 9/1978 | Troy . |
| 4,181,288 | 1/1980 | Bylsma ...................... 251/129.11 |
| 4,338,961 | 7/1982 | Karpenko . |
| 4,471,942 | 9/1984 | Kocanowski . |
| 4,535,803 | 8/1985 | Price ............................ 251/312 X |
| 4,546,338 | 10/1985 | Idogaki et al. ............. 251/129.11 X |
| 4,596,374 | 6/1986 | Thompson et al. . |
| 4,609,074 | 9/1986 | Berrend . |
| 4,638,519 | 1/1987 | Hess . |
| 4,686,722 | 8/1987 | Swart . |
| 4,745,647 | 5/1988 | Goodwin . |
| 4,798,227 | 1/1989 | Goodwin . |
| 4,865,076 | 9/1989 | Newcombe et al. . |
| 4,949,414 | 8/1990 | Thomas et al. . |
| 4,951,712 | 8/1990 | Becker . |
| 5,044,029 | 9/1991 | Vrzalik . |
| 5,062,171 | 11/1991 | Vrzalik . |
| 5,108,075 | 4/1992 | Downard et al. .......... 251/312 X |
| 5,121,513 | 6/1992 | Thomas et al. . |
| 5,137,257 | 8/1992 | Tice ........................... 251/129.12 X |

*Primary Examiner*—Gerald A. Michalsky
*Attorney, Agent, or Firm*—Dority & Manning

[57] ABSTRACT

A proportional flow control valve is provided for use with low air loss patient support systems. The valve includes a valve housing having an inlet and an outlet defined therein with a valve passage defined through the housing between the inlet and outlet. A chamber is defined in the housing, the chamber further including a nipple cavity defined in the bottom thereof and a cam stop extending from the bottom into the chamber. A valve spool is rotatably disposed within the chamber. The valve spool includes an alignment nipple fitting into the nipple cavity and a cam defined on the bottom thereof through a predetermined rotational arc. The cam and cam stop cooperate to limit the rotational arc of the valve spool within the chamber. A proportional flow control groove is defined in the valve spool. The flow control groove establishes linear air flow through the valve depending on the angular displacement of the spool within the chamber. A motor is provided mounted to the housing to rotate the valve spool within the chamber and, preferably, a torque limiting clutch is disposed between the motor and valve spool. The valve spool further includes a friction reducing substance coated thereon or impregnated therein, such as teflon or the like, to reduce binding of the valve spool within the chamber.

17 Claims, 6 Drawing Sheets

PROPORTIONAL CONTROL VALVE FOR PATIENT SUPPORT SYSTEM

BACKGROUND OF THE INVENTION

The present invention relates to valves used in patient support systems, and more particularly to valves used to regulate the flow of air used for inflating sacs in a low air loss patient support system.

Examples of low air loss patient support systems include those described in U.S. Pat. Nos. 4,638,519 to Hess; 4,686,722 to Swart; 4,745,647 to Goodwin; and 4,949,414 to Thomas etal., which are hereby incorporated herein by reference. U.S. Pat. Nos. 5,044,029 and 5,062,171 to Vrzalik disclose another type of low air loss patient support apparatus which includes an air controlled box interposed in the flow of air from a gas source to a plurality of gas manifolds that connect to the air bags. The air control box has individually adjustable valves for changing the amount of gas delivered to each of the gas manifolds.

The patient support systems of today demand increasingly sophisticated control valves. Moreover, a low air loss patient support requires maintenance by both technical personnel and hospital personnel. The cost of providing such maintenance is directly proportional to the time required to perform such maintenance. Time spent repairing a flow control valve while it remains in the patient support, as well as time spent removing and replacing the valve so that the removed valve can be repaired at a remote location, contributes to the maintenance cost (including the cost of non-use of the patient support during the repair) of the patient support. Thus, the sophisticated patient support systems of today require increasingly reliable and trouble-free flow control valves if the system is to be cost effective in an environment that is becoming more sensitive to ever increasing hospital and health care costs.

OBJECTS AND SUMMARY OF THE INVENTION

It is a principal object of the present invention to provide a reliable proportional flow control valve to be used in applications requiring a means of controlling the rate of flow through the valve.

Another principal object of the present invention is to provide an improved proportional flow control valve which is insensitive to vibration and shock, thereby reducing the maintenance requirements for such a valve.

Yet a further principal object of the present invention is to provide an improved proportional flow control valve for use in a modular construction and arrangement of a low air loss patient support system wherein the modular adaptability of the valve facilitates use, repair, and maintenance of the support system.

Yet another principal object of the invention is to provide a flow control valve insertable into a modular manifold for distributing pressurized air to sacs on a low air loss patient support system, the valve being easily connected and disconnected from the manifold by hand for ease of maintenance and servicing.

Still another principal object of the present invention is to provide a proportional flow control valve having means for monitoring the pressure delivered at the exit of the valve and maintaining this pressure within predetermined set limits.

A further principal object of the present invention is to provide a proportional flow control valve having means for manually sampling the pressure in the valve and which includes means for rapidly closing off the valve inlet while opening the valve outlet to atmosphere to rapidly deflate air bags of a patient support system.

Still another principal object of the present invention is to provide a proportional flow control valve for a patient support system which is engineered to withstand the abuse and rigors of continuous operation with minimum maintenance and servicing thereof.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a proportional flow control valve is provided having a housing with an inlet defined therein for receiving air flow from a pressurized air source, such as a blower or similar device. The valve housing also includes an outlet and a valve passage is defined in the valve housing between the inlet and outlet. A chamber is defined in the housing and is disposed substantially perpendicular to the axis of the valve passage. The chamber further includes a nipple cavity defined in the bottom thereof.

In accordance with the present invention, a means is provided for controlling the flow of pressurized air between the inlet and outlet of the housing in direct proportion to the degree of rotational displacement of the valve spool within the chamber. In a preferred embodiment, the flew control means includes a flow control member, preferably a valve spool, which is rotatably disposed within the chamber.

In still further accordance with the present invention, a means is provided to maintain the axial alignment of the flow control member and prevent the flow control member from binding within the housing. As embodied herein, the binding prevention means for the flow control member includes a nipple formed to extend from one end of the valve spool along the axis of rotation of the spool. The nipple may be formed integral with the spool 38 and extending generally from the bottom thereof. As embodied herein, the binding prevention means for the flow control member may further include a nipple cavity configured to rotatably receive the nipple in a manner that permits the spool to rotate freely about its axis of rotation. The nipple cavity is defined in the housing in the bottom of chamber. In this manner, the nipple and the nipple cavity cooperate to maintain the spool in axial alignment within the chamber. The nipple and the cavity aid in preventing the spool 38 from binding within the chamber and greatly increase the reliability of the valve. The clearance between the nipple and the internal housing walls defining the nipple cavity is preferably about 0.0005 inches, which is significantly tighter than the clearance between the flow control member and the internal housing walls which define the chamber. Thus, the nipple and the nipple cavity maintain the spool precisely axially aligned within the chamber and prevent binding between the spool and the housing's internal walls defining the chamber during rotation of the flow control member in the chamber.

The valve spool also desirably has a proportional flow control groove defined therein. This groove defines a varying flow passage through the valve spool. The groove varies according to the rotational position of the spool within the valve chamber. In a preferred embodiment, the flow control groove defines three distinct sections with each section having a different height dimension when measured in the longitudinal direction of the valve spool. The flow through the valve is regulated according to which of the three distinct sections is aligned with the axis of the valve passage. In this manner, the spool proportionally controls flow through the valve by rotating within the chamber to align different sections with the valve passage. In this sense, the flow through the valve is proportional to the degree of rotation of the valve spool. However, while the flow through the valve varies proportionally as the spool is rotated, the proportional relationship between flow and rotation is not exactly linear.

Preferably, the flow control valve further comprises a motor mounted to the valve housing for selectively rotating the valve spool within the chamber. In one preferred embodiment, the motor comprises a drive shaft which is directly connected to the valve spool. In an alternative preferred embodiment, a torque limiting clutch is operatively disposed between the motor and the valve spool to protect the motor from an over torque condition. An electrical circuit is connected to the motor for controlling the operation thereof. A motor cover generally encompassing the motor is also provided and is removably attachable to the valve housing.

In order to prevent dislocation of the motor from the valve housing or from the valve spool, it is preferred to provide the flow control valve with a motor support bracket which generally encircles the motor and is secured to the valve housing. The bracket prevents relative movement between the motor and the housing even if the valve is dropped or otherwise physically shocked.

The flow control valve further includes a means for limiting the degree of rotation of the flow control member within the chamber to a predefined rotational arc. The means for limiting the degree of rotation of the valve spool within the chamber preferably comprises a cam defined on the bottom of the valve spool and a cam stop formed in the housing which extends into the chamber. The cam subtends a predefined arc through which the valve spool rotates within the chamber by contacting the cam stop at the limits of the cam. In this manner, the cam and cam stop cooperate to define the rotational arc of the valve spool.

In order to prevent binding of the valve spool within the chamber and to reduce the frictional interface between the spool and chamber circumference, it is preferred to provide the valve spool with a friction reducing substance. This substance may comprise a coating on the valve spool or, in an alternative embodiment, may be impregnated in the valve spool. Preferably, this friction reducing substance comprises teflon or a like material. Alternatively, the entire valve spool may be formed of a friction reducing type plastic or the like.

The proportional flow control valve further preferably includes a pressure transducer that communicates with the valve passage to sense the pressure therein. The pressure transducer converts the pressure sensed in the valve passage into an electrical signal that is transmitted to an electrical control circuit mounted on a circuit card of the valve. The circuit card receives the electrical signal transmitted from the transducer corresponding to the pressure being sensed in the valve passage. The circuit card has a comparator circuit that compares the signal from the transducer to a reference voltage signal, which can be received from a microprocessor via a circuit board of a log manifold for example. The valve control circuit controls the valve motor according to the result of the comparison of the signals received from the microprocessor and transducer to open or close the valve to increase or decrease the flow. The control valve has an electrical lead that is connected to the valve circuit card and terminates in a plug that can be connected to an electrical connection fitting.

The valve of the present invention also preferably comprises a dump hole defined in the housing to extend from the valve chamber. In this embodiment, the flow control groove further includes a dump passage defined through the valve spool and configured to be aligned in communication with the dump hole upon a certain rotational displacement of the valve spool within the chamber. In this alignment, the valve spool completely blocks the inlet side of the valve passage and the valve outlet becomes connected in communication with the dump passage and the dump hole. In this configuration, any pressurized air sac connected to the outlet of the valve, is allowed to vent from the valve outlet through the dump passage and the dump hole.

The valve further includes a manual pressure check opening defined through the housing into the valve passage. A test fitting is inserted into the pressure check opening to seal the opening yet allow a probe to be inserted therethrough for measuring the internal valve pressure. This test fitting may comprise any manner of conventional check valve or test port fitting.

A programmable microprocessor can be pre-programmed to operate one or more of the proportional flow control valves according to the invention, and the outlet of a blower can be connected in communication with the valve inlet to pressurize the sacs of a patient support at a desired reference pressure. The microprocessor can be preprogrammed to calculate an optimum reference pressure in the sacs supporting each body zone of the patient. This reference pressure can be predetermined at the valve passage where the pressure transducer of each control valve is sensing the pressure. The circuit card of the valve can compare the pressure being measured by the transducer in each valve passage with the reference pressure which the microprocessor has calculated for the particular conditions of operation. Depending upon whether the measured pressure is greater than or less than the calculated reference pressure, the circuit card signals the valve's motor to open or close the passage through the valve by rotating the valve spool to increase or decrease the pressure in order to achieve the target reference pressure. The circuit card continuously monitors this comparison and controls the valve accordingly.

The accompanying drawings which are incorporated in and constitute a part of the specification, illustrate at least one embodiment of the invention and, together with the description, serve to explain the principles of the invention.

DETAILED DESCRIPTION OF THE PREFERRED EMBODIMENTS

Reference will now be made in detail to the present preferred embodiments of the present invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover the modifications and variations of this invention provided they come within the scope of the appended and their equivalents.

Figure 1:
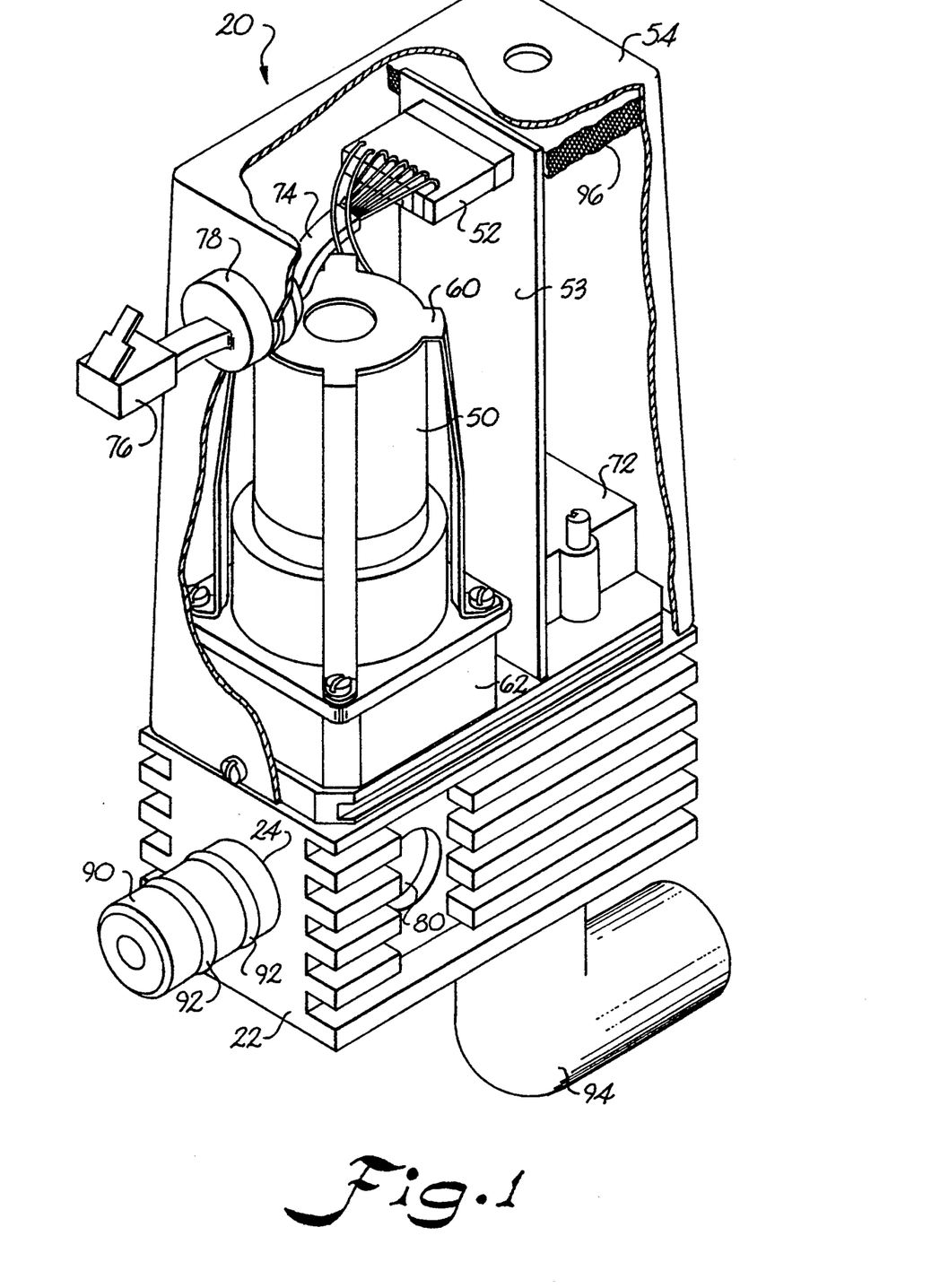
FIG. 1 illustrates a partially cut-away elevated perspective view of one preferred embodiment of the present invention.
Figure 2:
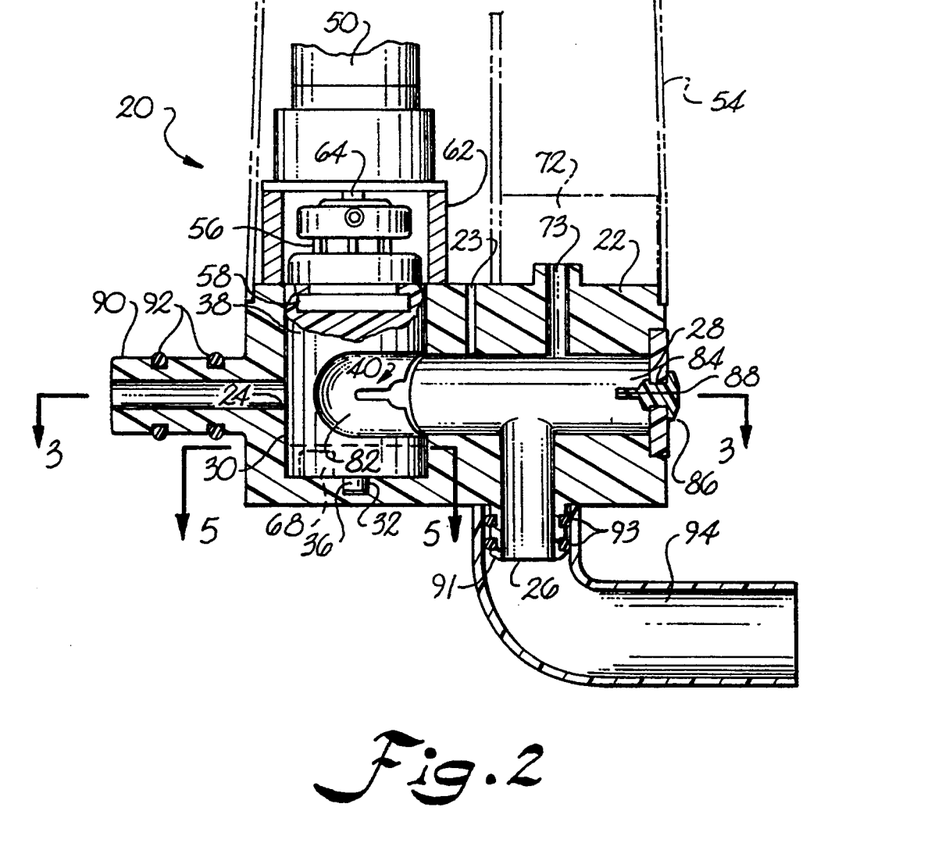
FIG. 2 illustrates a cut-away, plan, side view of an embodiment similar to the one shown in FIG. 1.
Figure 8:
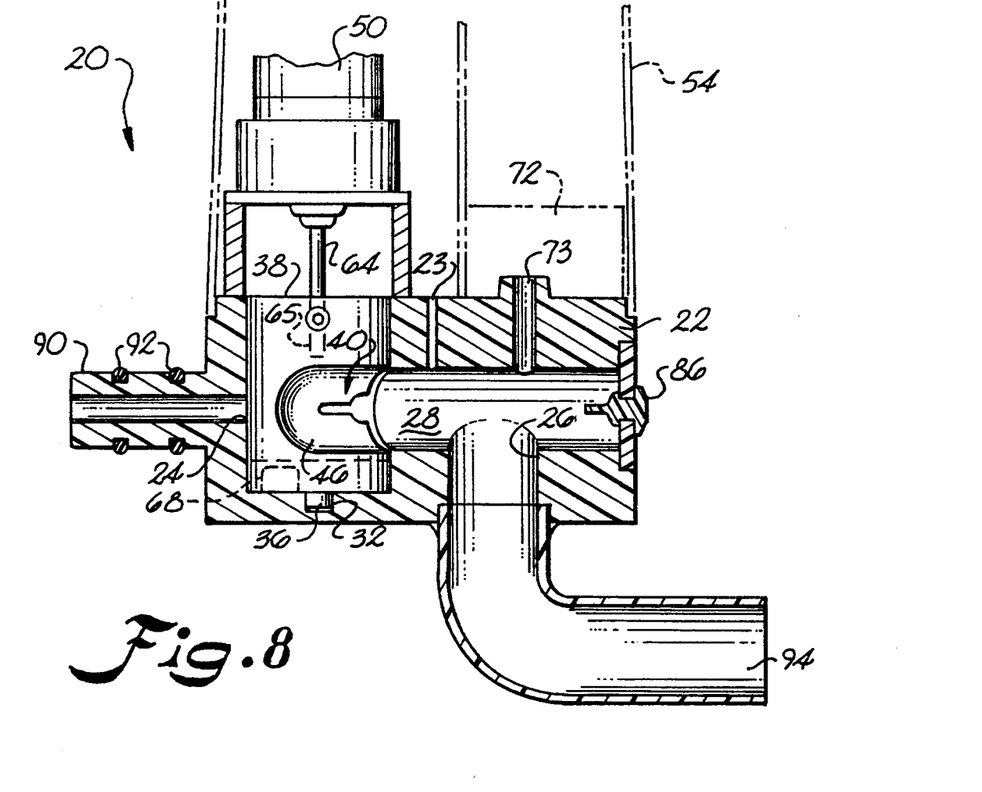
FIG. 8 is another partially cut-away, cross-sectional view of an embodiment of the present invention.

A preferred embodiment of the control valve according to the present invention is shown in FIGS. 1 and 2 for example. The control valve of the present invention includes a housing provided with an inlet and an outlet. The inlet is defined through the housing for receiving air flow into the valve. The outlet is defined through the housing for permitting air flow to exit from the valve. As embodied herein and shown in FIGS. 1 and 2, an embodiment of the control valve according to the present invention is indicated generally by numeral 20. Control valve 20 includes a housing 22, which preferably is formed of aluminum, plastic, or another sturdy, airtight, and light-weight material such as resinous polymeric materials. As used herein, air-tight is a relative phrase that refers to essentially no air leakage at the valve's operating air pressures, which desirably can be on the order of a 20 inch column of water. As shown particularly in FIG. 2, an inlet 24 is defined through one end of housing 22 for receiving air flow from a source of pressurized air such as a blower (not shown). An outlet 26 is also defined through housing 22 for permitting the escape of air exiting control valve 20. As shown in FIGS. 1 and 8, a detachable exhaust elbow fitting 94 is provided. As shown in FIG. 2, outlet 26 is connected in communication with an outlet stem 91 which is configured to receive a plurality of flexible O-rings 93. Elbow fitting 94 is easily manually detachable and engageable to outlet stem 91 via O-rings 93.

Control valve 20 also includes an elongated valve passage 28 defined in housing 22 between inlet 24 and outlet 26. Preferably, valve passage 28 is defined within housing 22 and has a longitudinal axis that preferably is disposed in axial alignment with inlet 24. The longitudinal axis of valve passage 28 preferably is disposed perpendicularly with respect to the axis of valve outlet 26, which communicates with valve passage 28. As shown in FIG. 2 for example, there is direct communication between valve passage 28 and valve outlet 26 insofar as outlet 26 is connected to valve passage 28.

As shown particularly in FIGS. 2 through 5, valve housing 22 further defines a chamber 30 disposed between inlet 24 and valve passage 28. Chamber 30 preferably is cylindrical with a circular transverse cross-section and is disposed within housing 22 so that its longitudinal axis is disposed substantially perpendicular relative to the longitudinal axis of valve passage 28.

In further accordance with the present invention, a flow control member is rotatably disposed within the housing and across the valve passage. As embodied herein and shown in FIGS. 2 and 6–9, an embodiment of the flow control member is defined by a valve spool 38. As shown in FIGS. 2 and 8, valve spool 38 is disposed within housing 22 so as to intersect valve passage 28 between inlet 24 and outlet 26. In particular, spool 38 is rotatably disposed within chamber 30. As shown in FIGS. 2 and 6–9 in particular, valve spool 38 has a flow control groove 40 defined therethrough, particularly around a portion of the circumference and into the center of spool 38. Depending upon the position of groove 40 relative to inlet 24 and valve passage 28, more or less air flow is allowed to pass from inlet 24, through groove 40, and into valve passage 28. Valve spool 38 is preferably formed of a hard polymeric or resinous material such as polycarbonate for example. Valve spool 38 is preferably cylindrical with a circular transverse cross-section and further configured and disposed so that it can be rotatably displaced within housing 22.

In accordance with the present invention, a means is provided for controlling the valve to supply a flow of air at a preselected pressure. As embodied herein, the supply pressure control means desirably includes a means for controlling the flow of air between the inlet and the outlet of the housing in direct proportion to the degree of rotational displacement of the flow control member within the housing. The proportional air flow control means desirably includes a means for rotating the flow control member.

Figure 9:
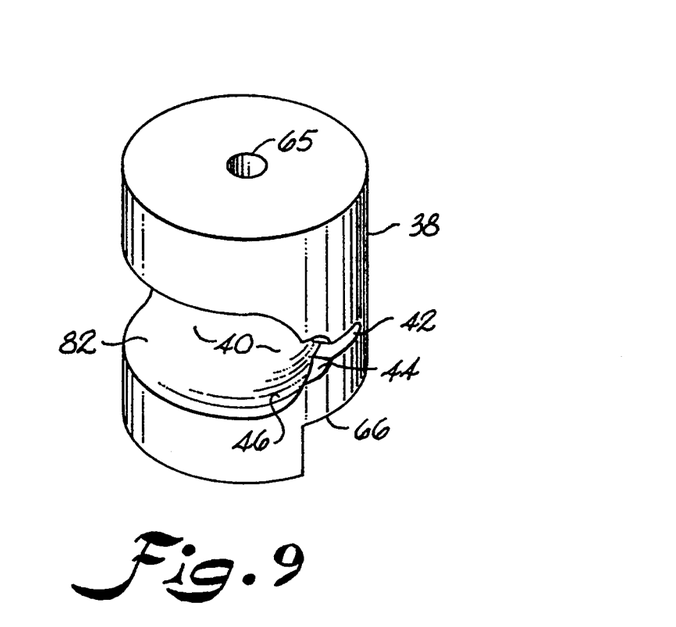
FIG. 9 is another perspective view of an embodiment of the valve spool component according to the invention.

As embodied herein, the means for rotating the flow control member preferably includes an electric motor and a means for connecting the motor to the flow control member in a manner such that operation of the motor rotates the flow control member within the housing of the valve. As shown in FIGS. 1, 2 and 8 for example, a valve motor 50 is disposed and mounted outside housing 22 and generally above chamber 30. Motor 50 includes a drive output shaft 64 which rotates during operation of motor 50. As shown in FIG. 9, a shaft hole 65 is defined centrally within the top of valve spool 38 and configured to receive output shaft 64 securably therein. In the embodiment of FIG. 8, shaft 64 has its end non-rotatably secured within shaft hole 65 of spool 38. Shaft 64 may also comprise an additional connecting shaft extending from motor 50. Preferably, shaft 64 is concentrically connected to the central rotational axis of spool 38. As the motor shaft 64 rotates, valve spool 38 is angularly displaced within chamber 30.

In an alternative preferred embodiment of the present invention as illustrated in FIG. 2, the means for connecting the motor to the flow control member in a manner such that operation of the motor rotates the flow control member within the housing of the valve, includes a torque-limiting clutch 56 which is operatively disposed between motor 50 and valve spool 38. Torque-limiting clutch 56 protects the gears of motor 50 from being subjected to a condition in which excessive torque is applied to the gears, such an over-torqued condition could occur, for example, if spool 38 were to bind within chamber 30 or when a cam stop 68 (described hereafter) meets the defined edges of a cam 66 (described hereafter). A Polyclutch TM torque-limiting clutch available from Custom Products Corp. of North Haven, Connecticut can be used in the present invention as may other torque-limiting clutches. The drive end of clutch 56 is non-rotatably secured to valve spool 38 and preferably includes a knurled extension 58 extending into valve spool 38. As shown in FIG. 2 wherein spool 38 is partially cut away to reveal extension 58, spool 38 is preferably molded around the knurled extension so as to interdigitate therewith. Extension 58 may have any suitable engaging surface such as alternate protuberances or recesses.

As noted above, the means for controlling the valve to supply a flow of air at a preselected pressure, includes a proportional air flow control means. As embodied herein, the proportional air flow control means can include an electrical control circuit and a pressure transducer. As shown in FIG. 1 for example, a connector sub-assembly 52 is mounted to a circuit card 53 containing an electrical control circuit 55 (schematically shown in FIG. 10) which governs the opening and closing of the valve to maintain a preselected pressure. Components of the electrical control circuit 55 may be mounted on card 53 on either side thereof and are not specifically illustrated in FIG. 1. The control circuit can include voltage comparator chips, timing chips and voltage reference chips and is configured to control the power being provided to valve motor 50. The control scheme of the control circuit on circuit card 53 is based on the results of the voltage comparisons performed by the control circuit. One of the input voltages received by the control circuit 55 for comparison can be provided by a pressure transducer 72 which provides a voltage representing a measured pressure from the valve passage 28 of the valve or at another location indicative of the pressure of the air flow supplied from the outlet of the valve. Another input voltage for comparison by the control circuit 55 can be provided to the control circuit by a microprocessor which provides a set point voltage representing a desired or set pressure for the valve.

As shown in FIGS. 1 and 2, a pressure transducer 72 is provided to communicate with valve passage 28 in order to sense the pressure therein. Transducer 72 is electrically connected to the control circuit on circuit card 53 for transmitting to the circuit a signal corresponding to the pressure sensed in passage 28. Preferably, transducer 72 is mounted to the exterior of valve housing 22, as illustrated in FIGS. 1 and 2. As shown in FIG. 2, an opening 73 is defined through valve housing 22 generally opposite where outlet 26 is defined therein. Pressure transducer 72 has a probe (not shown) either adjacent opening 73 or extending therein to permit the transducer to sense the pressure in valve passage 28. The pressure transducer converts the pressure sensed in the valve passage into an electrical signal such as an analog voltage. As schematically shown in FIG. 10, the electrical signal corresponding to the pressure sensed by transducer 72 is transmitted from the transducer 72 to the control circuit 55 on circuit card 53 (FIG. 1).

In one possible application such as described in U.S. Pat. No. 4,949,414, issued Aug. 21, 1990 to Thomas et al. (which is hereby incorporated herein by this reference) the valve circuit card 53 can be connected to receive a reference voltage signal from a microprocessor via a circuit board 150 shown in FIG. 10 of the '414 patent. A comparator circuit of the valve control circuit of circuit card 53, compares the signal from the microprocessor to the signal from pressure transducer 72 and computes a difference signal. The valve circuit 55 can control the valve motor 50 to open or close the valve 20 according to the magnitude and sign (plus or minus) of the difference voltage signal. Alternatively, a digitally based electronic control system could be used.

Figure 10:
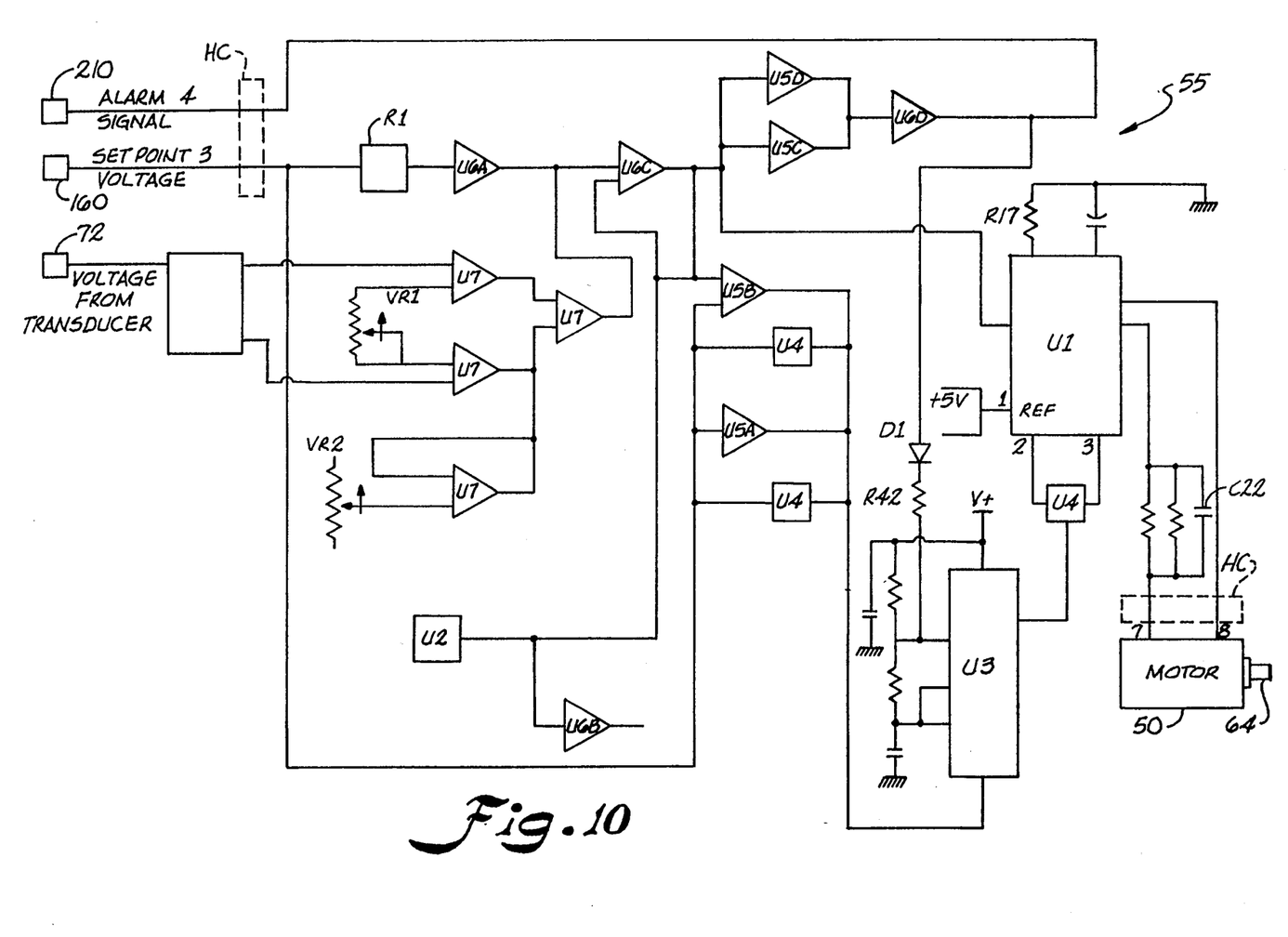
FIG. 10 is a schematic representation of a preferred embodiment of a component of the present invention.

The control circuit 55 schematically shown in FIG. 10 can operate the valve motor 50 by providing power to the motor for a predetermined period of time followed immediately by not providing power to the motor 50 for a second predetermined period of time. This defines one control cycle. Each of these control cycles (power on/power off repetitions) is characterized by a duty cycle which is the ratio of the length of time that power is being provided to run motor 50 divided by the length of time that defines one control cycle. For example, if the control cycle lasts 500 milliseconds and the motor is supplied with power during 100 consecutive milliseconds of that 500 milliseconds, then the duty cycle is 20%. Thus, the duty cycle is an indicator of how long valve motor 50 is run during each cycle of operation of the control circuit to rotate the flow control member 38 and accordingly adjust the pressure output of the valve.

In further accordance with the present invention, the electrical control circuit of circuit card 53 is configured with at least two control modes for turning valve motor 50 on and off based on the output of the comparison of the set pressure voltage for the valve and the voltage from transducer 72 corresponding to the measured pressure for the valve. The valve control circuit is desirably configured so that the so-called fast-stepping mode of valve control becomes operational when the comparison of the set pressure to the measured pressure yields a pressure difference greater than a predetermined value. In the fast-stepping mode of valve control, the valve motor 50 is kept running for a greater portion of each control cycle so that the set pressure can be reached as quickly as possible. In other words, the duty cycle of valve motor 50 is increased.

A second of the valve's control modes is the so-called slow-stepping mode of valve control which becomes operational when the comparison of the set pressure to the measured pressure yields a difference less than the predetermined value. In the so-called slow-stepping mode of valve control, small corrections to the valve setting are used for valve control. The duty cycle of the valve motor 50 is changed so that the motor stays off for a longer period between the times when the motor is run. In other words, a relatively shorter duty cycle is used in controlling the motor 50. Desirably, the duty cycle is changed so that the off time for the valve motor 50 is three times longer than the off time in the longer duty cycle. This is done to allow fine position correction of the valve assembly. The effect of this resulting smaller duty cycle is to enable the set pressure to be reached with less overshoot and more precise control as the set pressure is approached. This enables the set pressure to be reached faster than otherwise would be the case if the larger duty cycle were used and the resulting overshoots existed. The reduction in the overshoots enables the set pressure to be attained more quickly even though the duty cycle is reduced.

As embodied herein and schematically shown in FIG. 10, control circuit 55 may be configured to control the air pressure provided by the motor driven proportional valve 20 between zero and 20 inches of water column by comparing a control voltage (a.k.a. set point voltage) to a voltage generated by pressure transducer 72. For example, in operating the valve 20 to control the supply of pressurized air to air sacs of a low air loss bed as disclosed in the '414 patent, the operator selects a desired pressure for the sacs of a particular zone of the bed by keying this pressure on the bed's control panel. The control panel outputs a set point voltage corresponding to the desired pressure selected by the operator for the particular zone (e.g. head, torso, etc.) of the bed. The set point voltage ranges from zero to five volts with one volt corresponding to a pressure of zero inches of water and 5 volts corresponding to a pressure of 20 inches of water. The formula to compute the voltage corresponding to a pressure is 1 volt plus 0.2 volts for each inch of desired pressure above zero.

Referring to FIG. 10, a motor control driver U1 provides an output voltage to pins 7 and 8 of the header connector HC, which is electrically connected to valve motor 50. However, an oscillator chip U3 is configured to send a square wave to the motor control driver U1 via a section of chip U4. This square wave causes the motor control driver U1 to send a chopped DC signal to operate valve motor The duty cycle of this square wave is governed by the input that oscillator chip U3 receives from the comparators comprised of U5A and U5B along with sections of U4 as well as the input received by chip U3 in the form of an error signal provided from chip U6D through diode D1, resistor R42 and an RC network.

As schematically shown in FIG. 10, the set point voltage arrives on pin 3 of the header connector HC and will be between 1 and 5 volts in amplitude during normal operation and less than 0.8 volt during CPR mode control. After passing through an input resistor network R1, the control voltage emerges from a buffer amplifier U6A where an offset voltage has been applied. At the same time, control circuit 55 receives an output voltage from the pressure transducer 72, the voltage from transducer 72 representing the measured output pressure from valve 20.

Provision is made to compensate for individual transducer and amplifier differences by an electronic chip U7 and associated circuitry which includes a zero offset variable resistor VR2. As shown schematically in FIG. 10, the valve control circuit 55 of circuit board 53 further desirably includes a gain adjustment potentiometer VR1 for calibrating the valve. With the gain adjustment potentiometer, a more precise adjustment of the valve is possible during calibration than would be the case with a fixed reference resistor used for calibration.

As schematically shown in FIG. 10, the representative transducer voltage is compared with the control voltage and an error signal is generated at a summing amplifier chip U6C. This error signal is provided to motor control driver chip U1. The motor driver chip U1 operates the valve motor 50 in the direction required to minimize the difference between the summed voltage and a 5 volt reference voltage, which is provided to chip U1 via pin 1. Operating the valve motor 50 accomplishes this result because it is connected via output shaft 64 to the valve spool 38 which controls the flow of air from the valve 20. As the air flow is changed, the pressure in the air supplied at the valve outlet 26 changes accordingly and is sensed by pressure transducer 72 which accordingly signals the control circuit 55 of valve controller card 53.

The control circuit includes an alarm circuit which identifies when the calculated difference between the voltages exceeds plus or minus three-quarters of an inch of water. As schematically shown in FIG. 10, the error signal from the U6C chip is also sent to chip U5C and U5D where a comparison of the error is made with two voltage references. An error signal representing more than 0.7 inches of water column causes the output of chip U6D to go HIGH, thus sending an alarm signal out pin 4 of the header connector HC to a control panel 210. In addition, when this 0.7 inches of water band is exceeded, the alarm circuit causes another resistor (R42 in FIG. 10) to be included in the portion of the control circuit that determines the duty cycle. This additional resistor has the effect of shortening the off time of the motor during each control cycle. Accordingly, the length of time that the square wave voltage provided by U3 to U1 is non-zero to operate valve motor 50, is increased.

Another use is also made of the error signal. In a so-called continuous operating mode of valve control, larger than normal corrections are required. This mode is identified by a larger error voltage from chip U6C. In this mode of valve control, if the set point voltage is between 1 and 5 volts and the set point pressure is above the pressure measured by transducer 72 by 4 inches of water or more, chip U5A resets chip U3 to neutralize the chopped signal so that chip U3 causes chip U1 to send a continuous voltage to valve motor 50, and valve motor 50 runs continuously to its new location of valve spool 38.

The 3 modes described above are used when the valve is asked to provide a desired pressure and when maximum inflation of the air sacs is called for. However, when it is desired to connect the outlet 26 of the valve to atmosphere by rotating valve spool 38 to one extreme end of its allowable range of movement within chamber 30, such as when the valve is being used in a bed like the one in the '414 patent and the CPR function is activated, a set point voltage of 0.8 volts or less can be provided to control circuit 55 at pin 3 of header connector HC. When the control card circuit 55 receives a set point voltage of 0.8 volts or less, the control card circuit 55 bypasses the stepping speed selection process, and the valve motor 50 is quickly and continuously run to the full dump position of valve spool 38 relative to dump hole 80. As shown in FIG. 10, control circuit 55 is configured so that chip U5B resets chip U3 to neutralize the on/off chopped signal that is otherwise provided by chip U3, and accordingly chip U1 provides a constant voltage to run valve motor 50 continuously.

As shown in FIG. 10 and described above, control circuit 55 is configured to control valve motor 50 depending upon the value of the set point voltage and the value of the difference between the set point voltage and the voltage corresponding to the pressure measured by transducer 72. If the set point voltage, which may be received by circuit 55 at the instigation of a microprocessor 160 for example, is between 1 and 5 volts and the difference between the set point pressure and the pressure measured at transducer 72 is within a band of plus or minus 0.7 inches of water, chip U6D sends a low signal and chip U3 generates a chopped square wave signal with a duty cycle so that valve motor 50 is relatively slowly stepped by motor driver chip U1 toward the achievement of the set pressure. However, if the set point voltage is between 1 and 5 volts and the set point pressure is above the pressure measured by transducer 72 by between 0.7 inches of water and 4 inches of water, then chip U6D sends a relatively high voltage signal that causes chip U3 to increase the duty cycle so that chip U1 employs a relatively fast step control of valve motor 50 that results in a relatively rapid orienting of valve spool 38 to a position in which the pressure at the outlet 26 of valve 20 attains the desired set point pressure. This so-called fast step control is also operative when the set point voltage is between 1 and 5 volts and the set point pressure is below the pressure measured by transducer 72 by more than 0.7 inches of water. However, if the set point voltage is between 1 and 5 volts and the set point pressure is above the pressure measured by transducer 72 by 4 inches of water or more, then the larger error voltage provided from chip U6C causes chip U5A to reset chip U3 to neutralize the chopped signal so that chip U3 causes chip U1 to send a continuous voltage to valve motor 50, and valve motor 50 runs continuously to its new location of valve spool 38. When the set point voltage is between 1 and 5 volts and the difference between the set point pressure and the pressure measured at transducer 72 is within a band of plus or minus 0.3 inches of water, chip U6C sends a voltage to chip U1 that causes chip U1 to prevent valve motor 50 from running. Thus, once the actual pressure measured by transducer 72 is within plus or minus 0.3 inches of water of the desired pressure, valve motor 50 is turned off. This +/−0.3 inch bracket acts as a deadband to minimize dithering.

Desirably, the motor driver chip U1 includes an integrated circuit designed for controlling DC motors and has the capability of "clamping" the DC motor when the motor is turned off so that the back EMF cannot continue to operate the motor after it has been turned off. However, in order for this "clamping" capability of the chip to become effective, a capacitor of a certain minimum capacitance value must be provided. Accordingly, as shown schematically in FIG. 10, a 470 microfarad capacitor C22 is provided for this purpose in the control circuit 55 of circuit card 53. A capacitor with a capacitance of this magnitude also enables the valve control circuit 55 of circuit card 53 to provide a higher electric current to the motor 50 when the motor is started. This higher current starts the motor faster. The faster motor starting permits more precise operation of the motor 50 than would be possible with a smaller capacitor in the same control circuit board for the valve.

In addition, it may be desirable that the value of resistor R17 as shown in FIG. 10 has been increased to about 150KΩ rather than 100KΩ so that if spool 38 comes to a stop and motor 50 is driving the clutch 56 continuously, then motor driver chip U1 ceases providing power to motor 50. Moreover, it is desirable that the resistors in the resistor network such as R1 or those resistors (not shown separately in FIG. 10) used in conjunction with chips U7, U5C and U5D, be provided with tolerances of 1% in order to improve the thermal stability and repeatability of control circuit 55 and to reduce its drifting.

Generally, as shown in FIG. 1 for example, valve 20 of the present invention may also comprise a motor cover 54 which is detachably secured to housing 22 and generally encompasses motor 50, circuit card 53, and transducer 72. As shown in FIG. 1, valve 20 also includes an electrical cable 74 connected at one end to the connector sub-assembly 52 through appropriate electrical connections as illustrated, and terminates at the other end in a quick disconnect plug 76. As shown in FIG. 10 of the '414 patent, in one possible application, quick disconnect plug 76 can be connected into a plug outlet such as the electrical connection fitting 154 on a log manifold 128 ('414 patent), and thus is consistent with the construction of the present invention that renders the valve easily replaceable for on-site maintenance. Preferably, a strain relief 78 is provided between cable 74 and motor cover 54 so as to prevent pulling cable 74 from connector sub-assembly 52. As shown in FIG. 1, a muffler 96 is desirably disposed within cover 54 to absorb sound from motor 50.

In still further accordance with the present invention, a means is provided for maintaining the axial alignment of the flow control member and preventing the flow control member from binding within the housing. As embodied herein and illustrated particularly in FIGS. 2, and 5 through 8 for example, the binding prevention means for the flow control member includes a nipple 36 formed to extend from one end of valve spool 38 along the axis of rotation of spool 38. Nipple 36 may be formed integral with spool 38 and extending generally from the bottom thereof. As shown in FIGS. 2, and 5 through 8 for example, the binding prevention means for the flow control member may further include a nipple cavity 32 configured to rotatably receive nipple 36 in a manner that permits spool 38 to rotate freely about its axis of rotation. Nipple cavity 32 is defined in housing 22 in the bottom of chamber 30. In this manner, nipple 36 and cavity 32 cooperate to maintain spool 38 precisely axially aligned within chamber 30. Nipple 36 and cavity 32 aid in preventing spool 38 from binding within chamber 30 and greatly increase the reliability of valve 20. The clearance between the nipple and the internal housing walls defining nipple cavity 32 is preferably about 0.0005 inches, which is significantly tighter than the clearance between the flow control member 38 and the internal housing walls defining chamber 30. Thus, the nipple 36 and nipple cavity 32 maintain the spool 38 axially aligned within the chamber 30 and prevent binding between the spool and the housing's internal walls defining the chamber.

In further accordance with the binding prevention means for the flow control member, the circumference of spool 38 preferably is substantially the same as that of chamber 30 to reduce the possibility of any axial misalignment between spool 38 and chamber 30. In a preferred embodiment, the clearance between the spool and the walls defining the chamber is approximately 0.005 inches. Since spool 38 comprises a relatively tight fit with chamber 30, it is preferred that spool 38 also comprise a friction reducing material, such as a teflon coating or other lubricating surface. In an alternative preferred embodiment, spool 38 contains a friction reducing substance or material impregnated therein. Alternatively, spool 38 may be comprised entirely of a friction reducing material. The incorporation of such a material as teflon into spool 38 reduces the occurrence of binding of the spool within chamber 30.

Figure 3:
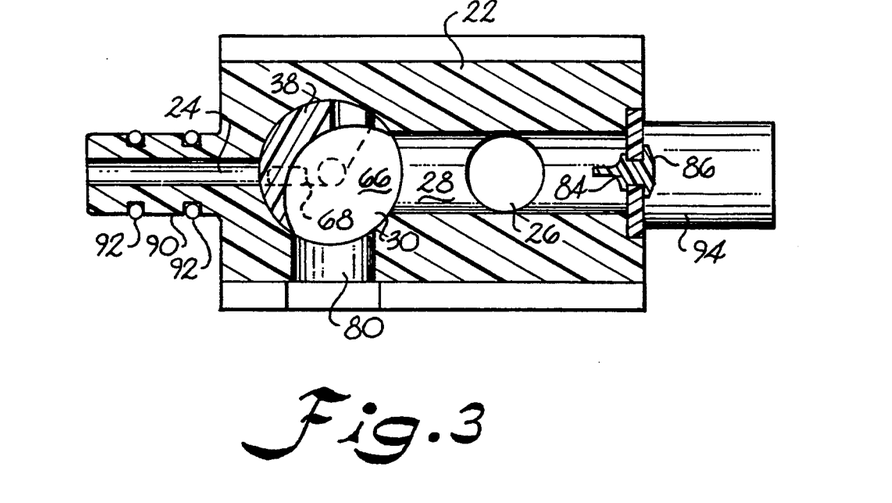
FIG. 3 illustrates a cross-sectional view of the embodiment taken along the lines 3—3 shown in FIG. 2.
Figure 4:
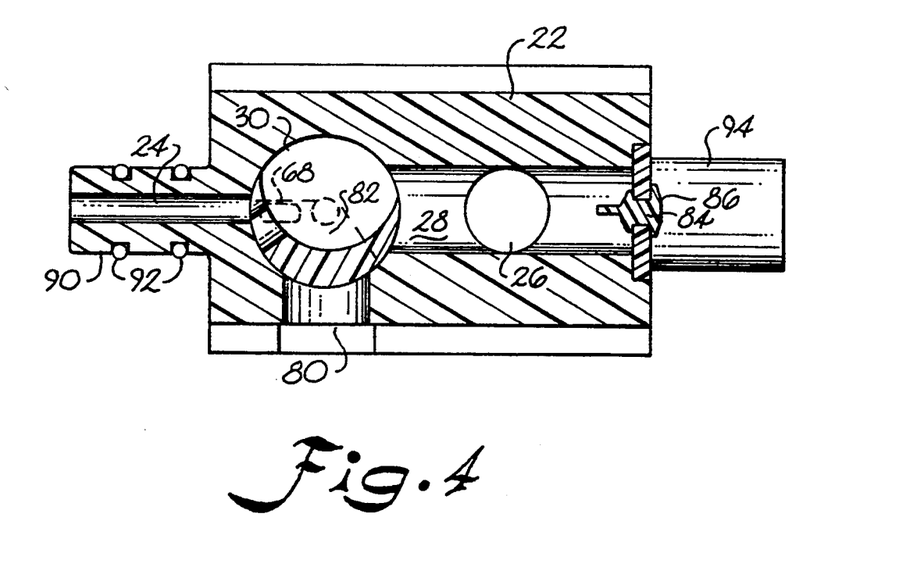
FIG. 4 is similar to FIG. 3 and illustrates another cross-sectional view of the components shown in FIG. 2.
Figure 5:
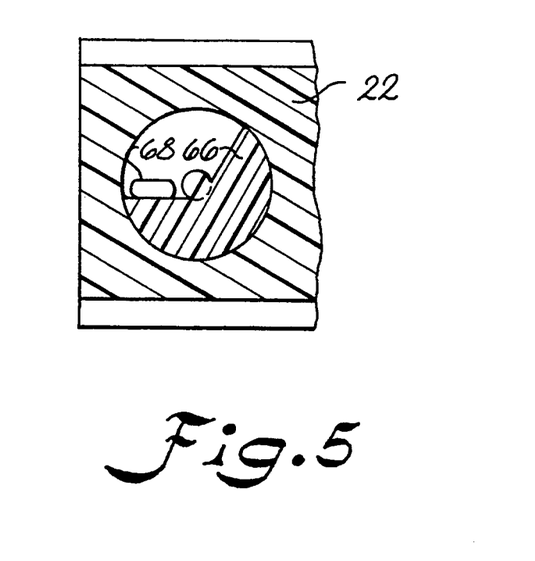
FIG. 5 illustrates yet another cross-sectional partial view of certain components shown in FIGS. 1 through 4.

In accordance with the present invention, a means is provided for limiting the degree of rotation of the flow control member within the valve housing. As particularly illustrated in FIGS. 3 through 7, in one preferred embodiment the rotation limiting means comprises a cam 66 and a cam stop 68. Cam stop 68 is preferably molded into the chamber 30 and extends outwardly therefrom. Valve spool 38 comprises a cam 66 defined generally in the bottom thereof. Cam 66 essentially defines the rotational arc of spool 38 within chamber 30. As shown in FIGS. 3 through 5 in particular, cam stop 68 cooperates with cam 66 to limit the degree of rotation of valve spool 38 to a span of about 135°. The angular or rotational position of valve spool 38, and correspondingly its flow control groove 40, within chamber 30 determines the degree of communication that is permitted through the chamber and the degree of communication permitted between valve passage 28 and inlet 24. This degree of communication effectively regulates the rate of air flow delivered by the valve.

As noted above, the means for controlling the valve to supply a flow of air at a preselected pressure, includes a proportional air flow control means. As embodied herein and shown in FIGS. 2–4 and 6–9, the proportional air flow control means can include a specially configured flow control groove 40 defined in the flow control member 38. As noted above, while valve spool 38 is rotatably disposed in chamber 30, a close clearance between the outer cylindrical surface of spool 38 and the internal housing walls defining chamber 30 is necessary so as to minimize any passage of air thereby. The flow of air permitted past the flow control groove 40 determines the flow at the outlet of the valve. Moreover, the flow of air permitted past the flow control groove 40 is proportional to the rotation of the flow control member 38 in the sense that as rotation of the flow control member varies, the flow at the outlet of the valve also varies. The flow control groove 40 may be configured to result in a linear relationship between the air flow permitted through the valve and the rotation of the flow control member 38 within the chamber 30. However, such perfectly linear relationship is not a necessity.

As discussed above, the proportional flow control groove 40 is configured to result in a proportional relationship between the air flow permitted through the valve and the angular displacement of spool 38 within chamber 30. As shown particularly in FIGS. 6–9, groove 40 is defined through the cylindrically shaped exterior surface of spool 38 and extends circumferentially for about 215° around the exterior surface of the spool. Groove 40 defines a cavity deep into spool 38. Preferably, groove 40 comprises three distinctly shaped, yet consecutively connected, sections.

As shown in FIGS. 8 and 9 for example, section 46 of groove 40 has the largest height dimension (height being measured along the longitudinal axis of spool 38) and the largest length dimension (length being measured along the circumferential direction around valve spool 38) as defined on the surface of spool 38. On a flat plane, boundary 46 of the largest height section would be two parallel lines connected at each opposite end by a semi-circle. As shown in FIGS. 6–9 for example, first section 46 extends about 168° around the circumference of spool 38 and is cut completely through spool 38 from one side to the other. As shown in FIGS. 2 and 8 in particular, the height of section 46 could generally be larger than the diameter of valve passage 28. Moreover, first section 46 should be disposed in spool 38 so as to completely cover valve passage 28 and inlet 24 when spool 38 rotates past passage 28.

Figure 6:
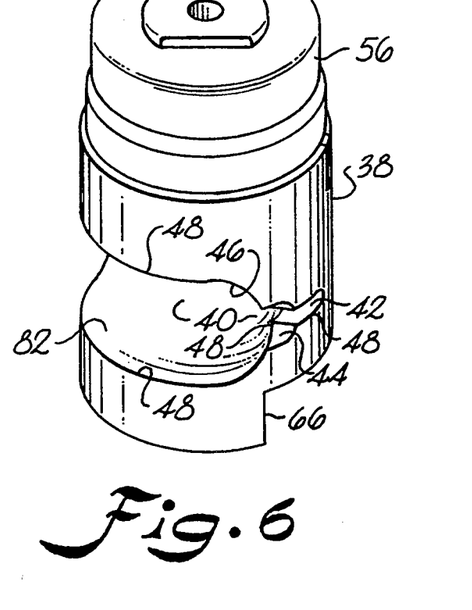
FIG. 6 is a perspective view of a valve spool component with attached clutch according to the invention.
Figure 7:
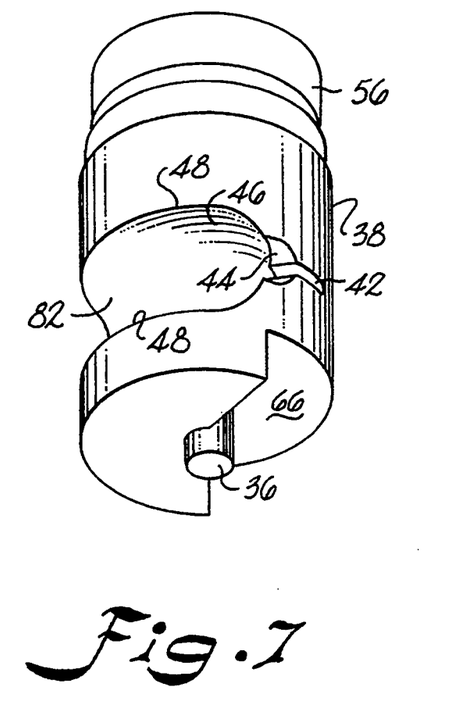
FIG. 7 is another perspective view of the spool shown in FIG. 6 and particularly illustrates the nipple and cam components.

The section of groove 40 with the smallest height dimension is a third section defined on the surface of spool 38 by the boundary designated generally as 42 in the figures. On a flat plane, boundary 42 of the smallest height section would be two parallel lines connected at one end by a semi-circle and at the opposite end intersecting into a second section of groove 40 defined generally by the boundary designated as 44 in the figures. As shown in FIGS. 6 and 7 in particular, section 46 extends from the semicircular end of second section 44 and section 42 preferably is disposed symmetrically about an imaginary center line that exists between parallel lines 48 (FIG. 7) that form the sides of section 46. As shown in FIGS. 6 and 7, third section 42 extends about 26° around the circumference of valve spool 38. Moreover, the semi-circular end portion of section 42 can be formed by being cut into valve spool 38 in a radial direction. Section 46 joins uninterruptedly with second section 44 and section 42 to form a continuous groove 40. As shown in FIGS. 6–9, the height of third section 42 is smaller than the diameter of valve passage 28 or valve inlet 24. The elongated portion of third section 42 can be best described as a slot extending radially through valve spool 38.

As shown in FIGS. 6–9, second section 44 extends about 21° around the circumference of spool 38. The height of second section 44 is smaller than the diameter of valve passage 28 or valve inlet 24, but larger than the height of third section 42. For example, if the height of first section 42 is about 5/8 inches, then the height of second section 44 is about 0.063 inches.

It should be understood that the flow control groove 40 as described above is but one preferred embodiment of a flow control groove establishing flow directly proportional to the angular displacement of spool 38. Alternative embodiments of groove 40, such as a groove having a constantly decreasing sloped boundary or other like configuration is within the scope and spirit of the present invention. Alternatively, a flow control groove producing a linear flow relationship with respect to the angular displacement of the spool may be provided.

In further accordance with the present invention, a means is provided for rapidly reducing the flow restriction in the valve by connecting the valve outlet to atmosphere. This means may comprise a dump outlet hole 80 defined through housing 22 in the vicinity of valve chamber 30, and a dump passage 82 defined through spool 38. Dump passage 82 can comprise, for example, a portion of section 46 of flow control groove 40, as best illustrated in FIGS. 6, 7, and 9. Dump passage 82 is configured to connect dump outlet hole 80 (FIG. 1) to valve passage 28 upon positioning of valve spool 38 such that the dump outlet hole 80 becomes aligned with section 46 of spool 38.

A potential application for the present control valve's ability to connect the outlet side of the valve to atmosphere, involves the patient support system described in the '414 patent referenced above. Typically, the control panel for this type of patient support has a button or mechanism for "SEAT DEFLATE". When the operator presses the seat deflate button, a microprocessor activates one or more control valves which control the pressure in the sacs supporting the seat of the patient. The microprocessor signals the control valve controlling the seat sacs to align their respective valve spools' dump passages 82 with the dump holes 80 defined in the valve housing 22 in order to permit all of the air in the sacs to escape to atmosphere through the dump holes. Also, the patient support may include an actuation device for the CPR mode of operation. When this device is actuated, the microprocessor turns off the blower and signals all of the control valves to align the dump passage 82 of their respective valve spool 38 with the valves' dump outlet holes 80. This causes rapid deflation of all of the air sacs so that the patient rests on the rigid support that carries the sacs and is suitable for performing CPR on the patient.

With past valves, it has been a serious problem that, if the valve were dropped for example, the motor would separate from the housing or otherwise become inoperable. In further accordance with the present invention, a means is provided for preventing relative movement between the motor and the housing. As embodied herein and shown in FIG. 1, the relative movement preventing means includes a motor support bracket 60. Support bracket 60 generally encircles or encompasses motor 50 and positively secures motor 50 to housing 22. As shown in FIG. 1 for example, support bracket 60 is mounted to housing 22 through a motor spacer 62. The support bracket 60 reduces the occurrence of motor 50 becoming displaced or misaligned due to vibration, shock, or the like from every day use or extreme conditions. As shown in FIG. 2 for example, motor spacer 62 provides a structural support for the base of motor 50 and also provides a space through which motor shaft 64 extends. In the embodiment of FIG. 2 wherein clutch 56 is utilized, spacer 62 provides a housing for clutch 56.

As shown in FIGS. 2 and 8, a calibrated weep hole 23 is provided as is conventional in the design of such valves to accommodate anticipated back pressures. In an embodiment dimensioned as described herein, weep hole 23 is provided with a diameter of about 90 thousandths of an inch. As shown in FIGS. 2 through 4 in particular, valve 20 also preferably comprises a test fitting such as a conventional pressure check valve 86 mounted in a manual pressure check opening 84 defined through housing 22. Fitting 86 has a port 88 defined therethrough for receiving a probe of a measuring instrument (such as a manometer). One supplier of such a conventional check valve is Vernay Labs of Yellow Springs, Ohio. Any manner of conventional test fitting may suffice for this purpose.

The present valve is configured to be mated with a log manifold such as described in the '414 patent and designated as numeral 128. Each of a plurality of ports 142 of log manifold 128 includes a bushing 144 mounted therein and is configured for receiving and securing a valve stem 90 of each valve 20. As shown in FIGS. 1-4 and 8, each valve stem typically has one or more O-rings 92 for engaging bushing 144 so as to form an airtight connection that is easily manually detachable and engageable. This permits easy removal and replacement of each valve 20 and reduces repair time and the downtime for the patient support system as a whole.

Operation of an embodiment of the present invention now will be described. For ease of reference and as shown in FIGS. 3 and 4, the end of flow control groove 40 that includes the valve spool surface defining sections 42, 44, and the portion of section 46 closest to second section 44, can be best described as the entrance end of flow control groove 40. The end of flow control groove 40 opposite the entrance end can best be called the exit end. The exit end of flow control groove 40 can be positioned to connect with either valve passage 28 or dump outlet hole 80, as shown in FIGS. 3 and 4. In the embodiment shown in the figures, when one of the surfaces of the valve spool's cam 66 engages cam stop 68 (FIG. 3), then the exit end of flow control groove 40 is aligned with dump outlet hole 80. In this position, flow control groove 40 connects dump outlet hole 80 with valve passage 28 and valve outlet 26, and blocks all communication between valve inlet 24 and chamber 30. When starting from this position, spool 38 can be rotated only in one direction, the engagement of cam stop 68 with cam 66 preventing rotation in the opposite direction. Rotation of the valve spool from this position moves the entrance end of control groove 40 into direct communication with valve inlet 24 and moves the exit end of control groove 40 into direct communication with valve passage 28, as best shown in FIG. 4. Thus, air flow is permitted between inlet 24 and outlet 26. As the valve spool is further rotated in the same direction, more of section 42 is exposed to direct communication with inlet 24 and eventually second section 44 and first section 46 of the control groove 40.

Moreover, the configuration of the entrance end of flow control groove 40 as described above and shown in the figures, is such that the rate of air flow permitted between inlet 24 (which has a circular cross-section with a diameter of about 0.25 inches in the embodiment illustrated) and outlet 26 (which has a circular cross-section having a diameter of about 0.625 inches in the embodiment illustrated) is proportional to the angular orientation of spool 38 within chamber 30. Beginning with the semicircular end of section 42, rotation of valve spool 38 over a span of about 43° suffices to the increase flow rate from zero to a maximum air flow rate between the inlet and the outlet.

What is claimed is:

1. A proportional flow control valve for an air bed, comprising:
   a housing;
   an inlet defined through said housing for receiving air flow from a pressurized air source;
   an outlet defined through said housing for directing pressurized air flow from said housing;
   a valve passage defined through said housing between said inlet and said outlet;
   a flow control member rotatably disposed within said housing and across said valve passage;
   a means for maintaining the axial alignment of said flow control member and preventing said flow control member from binding within said housing;
   a means for limiting the degree of rotation of said flow control member within said housing;
   a means for controlling the flow of air between said inlet and said outlet of said housing in direct proportion to the degree of rotational displacement of said flow control member within said housing, said proportional flow control means including:
a motor for selectively rotating said flow control member within said housing, said motor being mounted to said housing and having a rotatable output shaft;
a torque-limiting clutch operatively disposed between said motor output shaft and said flow control member for connecting said motor output shaft to said flow control member; and
an electrical control circuit connected to said motor for controlling operation of said motor; and
a motor support bracket generally encircling said motor and secured to said housing, said bracket being configured and disposed to prevent relative movement between said motor and said housing.

2. The valve as in claim 1, wherein said alignment maintenance and binding prevention means for said flow control member includes a nipple and a nipple cavity, said nipple being formed to extend from one end of said flow control member along the axis of rotation of said flow control member, said nipple cavity being defined in said housing and configured to rotatably receive said nipple in a manner that permits said flow control member to rotate freely about its axis of rotation.

3. The valve as in claim 1, wherein said proportional flow control means comprises a proportional flow control groove defined in said flow control member, said flow control member defining a valve spool, said groove defining a varying flow passage through said spool proportional to the rotational position of said spool within said housing.

4. The valve as in claim 3, wherein said flow control groove defines three distinct sections, each said section having a different height dimension measured in the longitudinal direction of said valve spool, wherein a first section connects uninterruptedly with a second section and said second section connects uninterruptedly with a third section, said spool proportionally controlling flow by rotating within said housing to align different portions of said sections with said valve passage.

5. The valve as in claim 4, wherein said sections are defined by substantially horizontal lines defined in the exterior surface of said spool with the distance between said horizontal lines decreasing from said first section to said third section.

6. The valve as in claim 3, wherein said means for limiting the degree of rotation of said flow control member comprises a cam defined on the bottom of said valve spool, said cam subtending a predefined arc through which said valve spool rotates, and a cam stop extending from said housing into said predefined arc, said cam and cam stop operating to define the rotational arc of said valve spool.

7. The valve as in claim 3, wherein said valve spool comprises a friction reducing substance to prevent binding of said valve spool within said housing during rotation thereof.

8. The valve as in claim 3, further comprising a dump hole defined through said valve housing and communicating with said valve passage, said flow control groove including a dump passage defined through said valve spool and configured to connect said dump hole in communication with said valve passage upon a predetermined orientation of said valve spool.

9. The valve as in claim 1, wherein said electrical control circuit is configured so that if said spool comes to a stop and said motor is driving said clutch continuously, then said electrical control circuit ceases providing electrical power to operate said motor.

10. The valve as in claim 1, wherein said clutch comprises a knurled extension extending into said valve spool, said valve spool being molded around said knurled extension.

11. The valve as in claim 1, further comprising a motor spacer component disposed between said motor and said valve spool, said motor output shaft extending through said motor spacer into said valve spool.

12. The valve as in claim 1, further comprising a pressure transducer communicating with said valve passage to sense the pressure in said passage, said transducer being connected to said electrical control circuit for transmitting thereto signals corresponding to the pressure sensed in said valve passage.

13. The valve as in claim 12, wherein said electrical control circuit is configured with at least two modes turning said motor on and off based on a comparison of a set pressure for the valve and a measured pressure for the valve, one of said modes being operational when said comparison yields a difference greater than a predetermined value and a second of said modes being operational when said comparison yields a difference less than said predetermined value.

14. The valve as in claim 1, further comprising:
a motor cover generally encompassing said motor, said cover being removably attachable to said housing; and
an electric cable extending through said motor cover and having one end electrically connected to said electrical control circuit and an opposite end terminating in a quick disconnect plug for electrically connecting said cable to a plug receptacle, said cable having a strain relief where said cable extends through said motor cover, said strain relief being configured to prevent pulling said cable from said control circuit.

15. The valve as in claim 1, further comprising a manual pressure check opening defined through said housing into said valve passage, and a pressure test fitting inserted into said pressure check opening, said pressure test fitting having a port therethrough for receiving a pressure measuring probe.

16. The valve as in claim 1, further comprising an elongated valve stem extending from said valve inlet and having one deformable O-ring secured therearound.

17. The valve as in claim 1, wherein said electrical control circuit is configured to prevent the back EMF from operating said motor after said electrical circuit ceases supplying electrical power to said motor.

* * * * *